United States Patent
Shaffer et al.

(10) Patent No.: US 7,170,991 B2
(45) Date of Patent: Jan. 30, 2007

(54) METHOD AND SYSTEM FOR UTILIZING PROXY DESIGNATION IN A CALL SYSTEM

(75) Inventors: Shmuel Shaffer, Palo Alto, CA (US); Shantanu Sarkar, San Jose, CA (US); Labhesh Patel, Mountain View, CA (US); Joseph F. Khouri, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 527 days.

(21) Appl. No.: 10/649,517

(22) Filed: Aug. 25, 2003

(65) Prior Publication Data
US 2005/0047582 A1    Mar. 3, 2005

(51) Int. Cl.
*H04M 3/00* (2006.01)
*H04M 3/42* (2006.01)

(52) U.S. Cl. .......................... 379/265.02; 379/211.01; 379/211.02; 379/212.01; 379/265.09

(58) Field of Classification Search .......... 379/265.02, 379/265.09, 266.01, 211.01, 211.02, 212.01
See application file for complete search history.

(56) References Cited

U.S. PATENT DOCUMENTS

| | | | | |
|---|---|---|---|---|
| 5,274,700 A | * | 12/1993 | Gechter et al. | 379/211.01 |
| 5,422,942 A | * | 6/1995 | Kakwashima | 379/212.01 |
| 5,526,416 A | | 6/1996 | Dezonno et al. | 379/265 |
| 5,590,187 A | * | 12/1996 | Greenspan | 379/212.01 |
| 5,703,943 A | * | 12/1997 | Otto | 379/265.11 |
| 5,724,420 A | | 3/1998 | Torgrim | 379/372 |
| 5,796,812 A | * | 8/1998 | Hanlon et al. | 379/212.01 |
| 5,991,645 A | | 11/1999 | Yuen et al. | 455/568 |
| 6,038,293 A | * | 3/2000 | McNerney et al. | 379/88.19 |
| 6,215,865 B1 | * | 4/2001 | McCalmont | 379/212.01 |
| 6,295,354 B1 | | 9/2001 | Dezonno | 379/266 |
| 6,301,354 B1 | * | 10/2001 | Walker et al. | 379/266.01 |
| 6,314,178 B1 | * | 11/2001 | Walker et al. | 379/266.01 |
| 6,546,097 B1 | | 4/2003 | Peltz | 379/265.07 |

OTHER PUBLICATIONS

U.S. Patent Application entitled, "*Method and System for Managing Calls of an Automatic Call Distributor*", inventors Shmuel (nmi) Shaffer, et al, filed Aug. 25, 2003, 34 pages Specification, Claims and Abstract, 2 sheets of drawings.

* cited by examiner

*Primary Examiner*—Bing Q. Bui
(74) *Attorney, Agent, or Firm*—Baker Botts L.L.P.

(57) ABSTRACT

A method for utilizing proxy designation in a call system includes receiving a call from a first user over a first connection with a first endpoint of the first user. The method includes receiving a proxy designation from the first user. The proxy designation comprises a proxy user designated to handle the call for the first user. The method also includes establishing a second connection with the proxy user and detecting the presence of the proxy user over the second connection.

52 Claims, 2 Drawing Sheets

METHOD AND SYSTEM FOR UTILIZING PROXY DESIGNATION IN A CALL SYSTEM

RELATED APPLICATION

This application is related to application Ser. No. 10/649,452, entitled "Method and System for Managing Calls of an Automatic Call Distributor," filed on Aug. 25, 2003.

TECHNICAL FIELD OF THE INVENTION

This invention relates in general to call systems and, more particularly, to a method and system for utilizing proxy designation in a call system.

BACKGROUND OF THE INVENTION

Automatic call distributors (ACDs) are specialized systems designed to match incoming requests for service, for example a telephone call, a chat or any other multi-media call or contact request with a resource that is able to provide that service, for example a human contact center agent. ACDs generally perform one or more of the following functions: (i) recognize and answer incoming contacts; (ii) review database(s) for instructions on what to do with a particular contact; (iii) use these instructions to identify an appropriate agent and queue the contact, often times providing a prerecorded message; and (iv) connect the contact to an agent as soon as the agent is available.

In current ACD systems, when a caller or user calls in and all agents are busy, the caller gets queued and has to wait for an available agent. The queue time depends on how soon the agent becomes available and the number of calls already in the queue. Usually the expected time to hold is only an estimation that can go either up or down, depending on the nature of the incoming calls. For example, in some cases a user who was told that the average hold time will be twenty minutes may be connected with an agent in only ten minutes. In another scenario, a call center may predict that an agent will be available for connection with a user in twenty minutes; however due to the complexity of the issues that are being addressed by the agents, or because high priority callers dialed in, the system will not be able to keep its original estimation. In this specific case, after the user has waited for ten minutes in the queue, he may hear that he still needs to wait for twenty minutes despite the fact that the same message was given to him ten minutes prior.

Under these circumstances a user may remain in the queue for a long period of time thinking that he will be able to take care of his business only to learn fifteen minutes later that the new expected wait time is longer than the free time he is able to stay in the queue and handle his business. In one scenario, if the user needs to rush to another meeting and the user is calling from home, he can ask his spouse to handle the call while he caters to other demands. In another scenario, a manager may use a similar method and ask his administrator to help him handle the queued call. However, when the call is being placed from another location or from a different phone, an option left for the caller may be to hang up and call later thus losing his place in the queue. A similar scenario may exist if the caller calls from a cell phone and his battery is about to die, or he is about to enter an area without good cell phone coverage.

SUMMARY OF THE INVENTION

The present invention provides a method and system for utilizing proxy designation in a call system that substantially eliminates or reduces at least some of the disadvantages and problems associated with previous methods and systems.

In accordance with a particular embodiment of the present invention, a method for utilizing proxy designation in a call system includes receiving a call from a first user over a first connection with a first endpoint of the first user. The method includes receiving a proxy designation from the first user. The proxy designation comprises a proxy user designated to handle the call for the first user. The method also includes establishing a second connection with the proxy user and detecting the presence of the proxy user over the second connection.

Detecting the presence of the proxy user may comprise authenticating the proxy user using a password of the proxy user. The proxy designation may comprise a uniform reference identifier (URI) of the proxy user and/or an authority grant to the proxy user for handling the call for the first user. The proxy designation may be received through instant messaging (IM), short message service (SMS) text messaging, speech recognition or dual tone multiple frequency (DTMF) signaling. The method may include placing the call in a queue until a suitable agent becomes available to provide service and notifying the first user of an approximate time for the call to progress through the queue. The method may also include establishing a virtual contact to hold a place of the call in an order in the queue if the first connection is terminated and associating the second connection with the virtual contact using the detected presence of the proxy user. The call system may comprise an automatic call distributor, and the call may comprise a request for service from a suitable agent.

In accordance with another embodiment, a call system utilizing proxy designation includes at least one interface port operable to receive a call from a first user over a first connection with a first endpoint of the first user. The system includes a proxy server operable to receive a proxy designation from the first user. The proxy designation comprises a proxy user designated to handle the call for the first user. The system includes a processor operable to establish a second connection with the proxy user and a presence server operable to detect the presence of the proxy user over the second connection.

Technical advantages of particular embodiments of the present invention include a method and system for utilizing proxy designation in a call system that allows an initial user to designate a proxy user to handle calls for the initial user with a call system such as an automatic call distributor. This proxy designation ability can save considerable time since an initial user who may not be able to complete the call, because of queue wait time or otherwise, does not have to call back and begin the call process over. Moreover, two callers who do not utilize the same phone, are not in the same location and are not on the same telephone or other exchange are thus allowed to participate in the call process.

Another technical advantage of particular embodiments includes increased security to the call process for a user. The proxy designation ability enables a user to allow a proxy user to handle a call without having to give the initial user's password or other authentication information to the proxy user to handle the call. Moreover, an audit trail and record is created so that each action by each respective user (both the initial user and the proxy user) is recorded as such.

Other technical advantages will be readily apparent to one skilled in the art from the following figures, descriptions and claims. Moreover, while specific advantages have been enumerated above, various embodiments may include all, some or none of the enumerated advantages.

BRIEF DESCRIPTION OF THE DRAWINGS

For a more complete understanding of the present invention and its advantages, reference is now made to the following description, taken in conjunction with the accompanying drawings, in which.

DETAILED DESCRIPTION OF THE INVENTION

Figure 1:
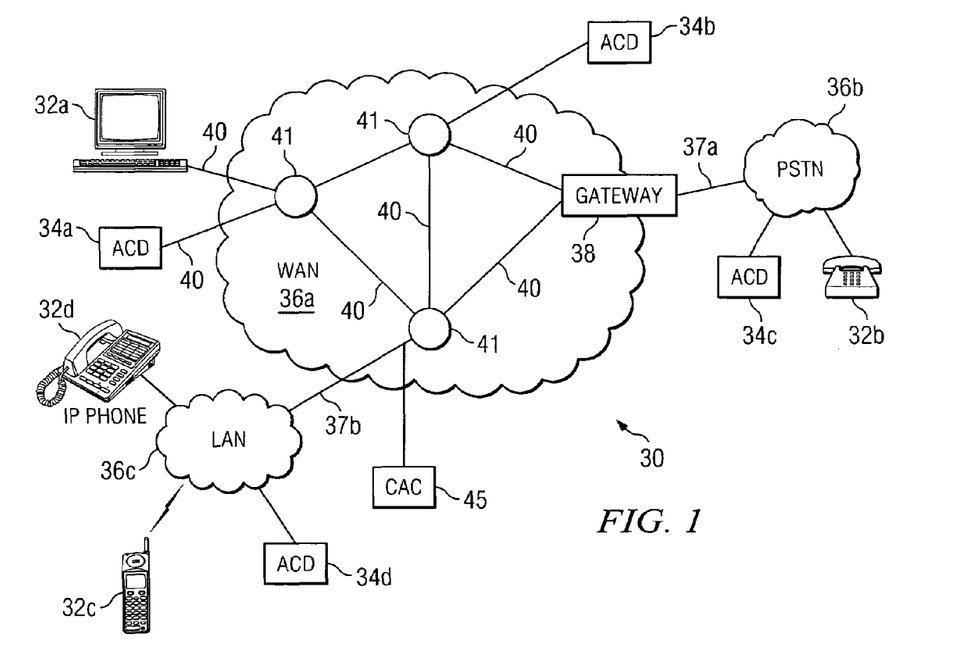
FIG. 1 illustrates a communication system including a plurality of endpoints operable to communicate among each other and a plurality of automatic call distributors, in accordance with a particular embodiment of the present invention.

FIG. 1 illustrates a communication system 30 including a plurality of endpoints 32a–32d having the ability to establish communication sessions between each other and/or automatic call distributors (ACDs) 34a–34d, using one or more of communication networks 36a–36c. Automatic call distributors are specialized call systems designed to route incoming calls to available agents, so that calls are properly and/or evenly distributed. For the purposes of this specification, "calls" and "contacts" shall include requests for service transmitted using any audio and/or video means, including signals, data or messages transmitted through voice devices, text chat, web sessions, facsimile, instant messaging and e-mail. Thus, references herein to a call shall also refer to a contact and vice versa. "Call system" shall refer to any combination of hardware, software and/or embedded logic which is operable to communicated calls between two or more endpoints, and "automatic call distributor" shall refer to any combination of hardware, software and/or embedded logic which is operable to automatically distribute incoming calls.

The teachings of the present invention provide a system and method for utilizing proxy designation in a call system that allows an initial user to designate a proxy user to handle calls for the initial user with a call system such as an automatic call distributor. Thus, the proxy user may act on behalf of the initial user when the initial user does not have the opportunity to handle one or more calls. Particular embodiments utilize presence detection in associating a proxy user with a call made by the initial user.

While particular embodiments of the present invention described herein relate to automatic call distributors, it should be understood that the proxy designation ability discussed herein can be utilized with other types of call systems, such as conference call and online meeting systems. For example, a user on a conference call may designate a proxy user to act on the initial user's behalf on the call. Presence detection may be used on the conference call to detect the presence of the proxy user on the conference call.

In the illustrated embodiment, communication network 36a is a wide area network (WAN) that enables communication between a plurality of endpoints 32a–32d and automatic call distributors 34a–34d distributed across multiple cities and geographic regions. In another embodiment, a single, central automatic call distributor may be used, which distributes incoming calls to agents distributed across multiple cities and geographic regions. Communication network 36b is a public switched telephone network (PSTN) and couples endpoint 32b and automatic call distributor 34c with communication network 36a through gateway 38. Communication network 36c is a local area network (LAN), which couples endpoints 32c and 32d and automatic call distributor 34d with communication network 36a. Accordingly, users of endpoints 32a-32d and automatic call distributors 34a–34d can establish communication sessions between and among each network component coupled for communication with one or more of networks 36a–36c. Communication links 37a and 37b couple communication networks 36a and 36b, and communication networks 36a and 36c, respectively. A call admission control (CAC) system 45 may be used to monitor the amount of bandwidth available over link 37b.

Communication network 36a includes a plurality of segments 40 and nodes 41 that couple endpoint 32a with automatic call distributors 34a and 34b, gateway 38, and communication networks 36b–36c. Therefore, a user of endpoint 32a is provided with access to endpoints 32b–32d, and automatic call distributors 34a–34d. Nodes 41 may include any combination of network components, gatekeepers, call managers, routers, hubs, switches, gateways, endpoints, or other hardware, software, or embedded logic implementing any number of communication protocols that allow for the exchange of packets in communication system 30.

Although the illustrated embodiment includes three communication networks 36a–36c, the term "communication network" should be interpreted as generally defining any network capable of transmitting audio and/or video telecommunication signals, data, and/or messages, including signals, data or messages transmitted through text chat, instant messaging and e-mail. Any one of networks 36a–36c may be implemented as a local area network (LAN), wide area network (WAN), global distributed network such as the Internet, Intranet, Extranet, or any other form of wireless or wireline communication network. Generally, network 36a provides for the communication of packets, cells, frames, or other portions of information (generally referred to as packets herein) between endpoints 32a–32d. Communication network 36a may include any number and combination of segments 40, nodes 41, endpoints 32a–32d, and/or automatic call distributors 34a–34d.

In a particular embodiment, communication network 36a employs voice communication protocols that allow for the addressing or identification of endpoints, nodes, and/or automatic call distributors coupled to communication network 36a. For example, using Internet protocol (IP), each of the components coupled together by communication network 36a in communication system 30 may be identified in information directed using IP addresses. In this manner, network 36a may support any form and/or combination of point-to-point, multicast, unicast, or other techniques for exchanging media packets among components in communication system 30. Any network components capable of exchanging audio, video, or other data using frames or packets, are included within the scope of the present invention.

Network 36a may be directly coupled to other IP networks including, but not limited to, another LAN, or the Internet. Since IP networks share a common method of transmitting data, telecommunication signals may be transmitted between telephony devices located on different, but interconnected, IP networks. In addition to being coupled to other IP networks, communication network 36a may also be coupled to non-IP telecommunication networks through the use of interfaces or components, for example gateway 38. In the illustrated embodiment, communication network 36a is coupled with PSTN 36*b* through gateway 38. PSTN 36*b* includes switching stations, central offices, mobile telephone switching offices, pager switching offices, remote terminals, and other related telecommunications equipment that are located throughout the world. IP networks transmit data (including voice and video data) by placing the data in packets and sending each packet individually to the selected destination, along one or more communication paths. Unlike a circuit-switched network (like PSTN 36*b*), a dedicated circuit is not required for the duration of a call or fax transmission over IP networks.

Technology that allows telecommunications to be transmitted over an IP network may comprise Voice over IP (VoIP), or simply Voice over Packet (Vop). In the illustrated embodiment, endpoint 32*d*, automatic call distributors 34*a*–34*b*, and gateway 38 are IP telephony devices. IP telephony devices have the ability of encapsulating a user's voice (or other input) into IP packets so that the voice can be transmitted over network 36*a*. IP telephony devices may include telephones, fax machines, computers running telephony software, nodes, gateways, or any other devices capable of performing telephony functions over an IP network.

Components of communication system 30 may utilize session initiation protocol (SIP) technology in the transmission of audio, video or other data across the system. As a result, users of endpoints 32 may be identified by components of system 30 according to a uniform reference identifier (URI), such as a user's e-mail address, or other suitable identifier so that a user may be located, monitored and/or contacted through presence detection technology. The use of presence detection by components of system 30 enable the components to capture information about various communication devices, or endpoints, available to a user and their status, such as whether a cellular phone is switched on or whether a user is logged into a personal computer (PC). The versatility of presence enables it to be used in both IP components, such as IP phone 32*d*, and other, non-IP components, such as components of PSTN 36*b*. For example, gateway 38 may comprise a SIP/PSTN gateway so that components coupled to PSTN 36*b* may utilize features and capabilities available through SIP technology.

It will be recognized by those of ordinary skill in the art that endpoints 32*a*–32*d*, automatic call distributors 34*a*–34*d*, and/or gateway 38 may be any combination of hardware, software, and/or encoded logic that provides communication services to a user. For example, endpoints 32*a*–32*d* may include a telephone, a computer running telephony software, a video monitor, a camera, an IP phone, a cell phone or any other communication hardware, software, and/or encoded logic that supports the communication of packets of media (or frames) using communication network 36*a*. Endpoints 32*a*–32*d* may also include unattended or automated systems, gateways, other intermediate components, or other devices that can establish media sessions. Although FIG. 1 illustrates a particular number and configuration of endpoints, automatic call distributors, segments, nodes, and gateways, communication system 30 contemplates any number or arrangement of such components for communicating media.

Figure 2:
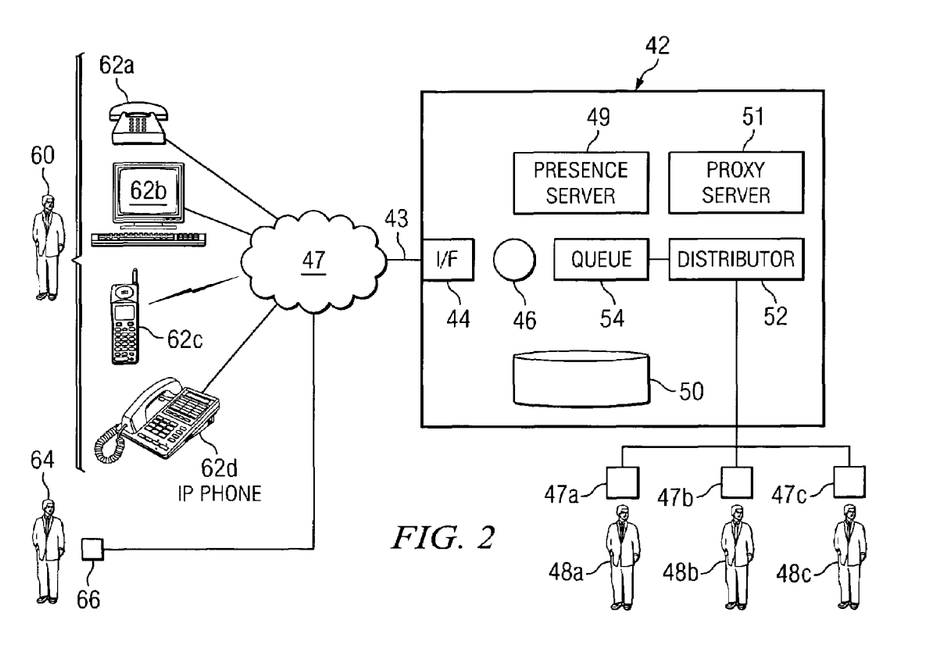
FIG. 2 illustrates an automatic call distributor in more detail, illustrating aspects of a particular embodiment of the present invention.

FIG. 2 illustrates an automatic call distributor 42 in more detail, in accordance with a particular embodiment of the present invention. ACD 42 may include the same components and operate in a similar manner to ACDs 34 of FIG. 1. ACD 42 includes an interface or interface port 44 which couples ACD 42 with a communication network 47, using segment 43. Communication network 47 may comprise one or more networks such as those described with respect to communication system 30 of FIG. 1.

When a call is received at ACD 42, a processor 46 determines which of a plurality of agents 48*a*–48*c* should receive the call using endpoints 47*a*–47*c*, respectively. Endpoints 47*a*–47*c* may comprise PCs, IP phones, cell phones or other devices which may be used by agents to communicate on a call. Processor 46 may use a memory lookup, a database or other memory module, such as memory module 50, in determining which agent should receive the call. Processor 46 may be a microprocessor, controller, or any other suitable computing device or resource. Memory module 50 may be any form of volatile or non-volatile memory including, without limitation, magnetic media, optical media, random access memory (RAM), read-only memory (ROM), removable media, or any other suitable local or remote memory component.

ACD 42 includes a presence server 49 and a proxy server 51 that may be any combination of hardware, software and/or encoded logic. As further discussed below, in one embodiment presence server 49 utilizes SIP technology to detect and/or monitor the presence of a particular user at an endpoint, (for example, at the user's PC, cell phone, IP phone or other device) and associate the call with a user's presence. Other non-SIP presence techniques known in the art may be used in other embodiments. To accomplish such functionality, presence server 49 may have access to any relevant information relating to or associated with the endpoints the user utilizes or accesses to communicate with the ACD. Presence server 49 may also utilize a password of a user to detect the user's presence and authenticate the user at an endpoint.

Proxy server 51 receives proxy designations from users to allow others to act on behalf of the users. For example, a user may desire to designate his spouse to act on his behalf on a call. The user may designate his spouse as his proxy, and proxy server 51 will receive such designation and work with presence server 49 to associate the user's call with the spouse when the spouse's presence is detected. In particular embodiments, proxy server 51 may be combined and/or integrated with presence server 49 into a single component.

ACD 42 uses processor 46 to monitor conditions of the ACD, such as the number, type or characteristics of calls in queues 54. It will be recognized by those of ordinary skill in the art that ACD 42 may include any number of processors or memory modules to accomplish the functionality and features described herein. The processors 46, memory modules 50 and/or presence server 49 associated with ACD 42 may be centrally located (local) with respect to one another, or distributed throughout communication network 47.

If a suitable agent is available to receive the incoming call, a distributor 52 of ACD 42 distributes the call to such agent for connection. Such connection may comprise, for example, coupling the user or caller of the call with the suitable agent if the call comprises a voice call, chat, IM, or other type of communication session. If a suitable agent is not available, the call may be placed into a queue 54 in order to wait for an appropriate agent(s). In this embodiment, ACD 42 has one queue 54; however other embodiments of the present invention may have none or more than one queue 54. The selection of which particular queue to place an incoming call may depend on the type of customer making the call, the type of service requested in the call or any other characteristic or condition relating to the call or ACD 42. While a caller is waiting for an agent, ACD 42 may perform one or more of several functions including data collection from the user, playing of pre-recorded messages or other automated process. As soon as a suitable agent becomes available, distributor 52 distributes the call to the appropriate agent.

In particular situations when a user's or caller's call has been placed into queue 54 and the user may thus be holding for a connection with a suitable agent 48, the user may desire to change his current endpoint connection to continue waiting for connection with a suitable agent. For example, in the illustrated embodiment user 60 has access to endpoints 62*a*–62*d* (home phone 62*a*, PC 62*b*, cell phone 62*c* and IP phone 62*d*). User 60 may be holding from his home phone 62*a* for connection with an agent 48 and may need to leave his home for a meeting or an appointment. In such case, user 60 may desire to change his current endpoint connection with ACD 42 to his cell phone 62*c*. User 60 then notifies ACD 42 of this intention. Such notification may be made by dual tone multiple frequency (DTMF) signal, speech recognition, instant messaging (IM), short message service (SMS) text messaging or any other suitable method. In particular embodiments, such notification may be made by user 60 in response to a query sent by ACD 42 asking the user whether he desires to end his current endpoint connection in order to change his endpoint connection or otherwise wait while unconnected on progression of his call through queue 54.

After sending the notification, user 60 may hang up, and ACD 42 will replace the user's call in queue 54 with a virtual contact holding the user's place in the queue. The virtual contact is associated with the presence of the user. When user 60 desires to reestablish his presence with ACD 42 on his cell phone 62*c* or other device, user 60 may log into presence server 49 using his cell phone 62*c* or other device. Presence server 49 identifies the presence of user 60 through the cell phone 62*c* or other device used to log user 60 into the presence server. When a new call arrives from an endpoint and the new call is associated with a user presence of a virtual contact waiting in the queue, ACD 42 recognizes that new call as a continuation of the previous call from user 60. The virtual contact in queue 54 is then replaced with the new real call. In the event that the virtual contact reaches the head of queue 54 before the new call arrives, ACD 42 may keep the virtual contact in queue 54 for a period of time before disposing of it. This period of time may vary in different embodiments, but in particular embodiments the virtual contact may be held at the head of queue 54 for approximately five minutes before ACD 42 disposes of the virtual contact.

In particular embodiments, user 60 may desire to be notified when his virtual contact being held in queue 54 nears or reaches the head of the queue. As discussed above, the virtual contact may be established in queue 54 because user 60 no longer desires to remain on hold with ACD 42. As the virtual call nears or arrives at the head of queue 54, ACD 42 may send a voice call, instant message, SMS text message and/or other type of message to the user's phone or other associated endpoint, such as a PDA or PC, informing user 60 that a suitable agent is ready to handle the user's call. Using the presence information of the user, ACD 42 is able to find the endpoint or device via which the user is available and send the notification to this device. The device to which the message is sent does not have to be the same as the device from which the initial call to the ACD was made. In response, user 60 may call ACD 42 and may be identified by presence server 49 by his presence on the phone or other device as the caller for whom an agent has just freed up. ACD 42 matches user 60 with his virtual call in queue 54 and proceeds to handle the user's real call accordingly. In particular embodiments, ACD 42 may notify the user through IM or SMS text messaging to a cell phone that a suitable agent is about to become available and may invite the user to call into ACD 42. ACD 42 may also notify the user through IM, SMS and other types of messages of the user's place in the queue on a continuing basis so that the user is aware of his call's status or progression through the queue.

In particular situations, when user 60 is either holding on an active connection for a call to progress through queue 54 or waiting while not actively connected for a virtual contact to progress through the queue, user 60 may have other appointments scheduled or may otherwise have time constraints that will prevent user 60 from being able to handle the call once it is connected with a suitable agent. For example, ACD 42 may notify user 60 that his call will be connected with an agent in a certain amount of time that is longer than user 60 has available to wait on such connection. In such case, user 60 may desire to designate another person as his proxy to handle the call. When another user is designated by user 60 to handle a call of user 60 as a proxy, the designated proxy user fills in for user 60 and may be entitled to perform some or all of the duties or tasks that user 60 is entitled to perform. When designating his proxy, user 60 may designate the type of tasks the proxy user may perform on behalf of user 60. For example, user 60 may have authority to perform certain tasks according to his position within an enterprise. User 60 may grant authority to user 64 to perform some or all of such tasks as proxy user on a call. Any information previously collected from user 60 by ACD 42, during a "prompt and collect" session or otherwise, may be used in providing service to the proxy user.

In the illustrated embodiment, user 60 designates user 64 as proxy for user 60. Such designation may be made by sending a URI or other identifier of user 64 to ACD 42 using DTMF signaling, voice command, IM, SMS text messaging, voice command or any other suitable method. User 60 may designate the proxy either while user 60 is holding on an active connection with ACD 42 or while a call of user 60 is progressing through the queue as a virtual contact. In particular situations, user 60 may phone or send an instant or other type of message to user 64 to determine whether user 64 would be available to act as proxy for user 60 on the user's call with ACD 42.

Proxy server 51 receives the designation of user 64 as proxy for user 60. User 64 may then call into ACD 42 to take the place of user 60 in queue 54. In some situations, user 64 may still be actively connected with ACD 42 on his call when user 64 calls into ACD 42. In such case, ACD 42 may notify user 60 that his proxy has called in so that user 60 can hang up and terminate his connection with ACD 42.

In one embodiment, the user and the user's proxy may be conferenced-in and allowed to exchange information via voice or other means while both the user and the user's proxy are in the queue, and both are associated with the same presence. In fact, both the user and the user's proxy may be connected with the agent when the agent is available, together via a three way conference call (user, user's proxy and agent).

The following scenario is offered by way of example and not by limitation: If a user places a call to an attorney for the purpose of obtaining legal advice, the user may be placed in the queue of an attorney is not available to take the call. The user may designate his wife as a proxy to handle the call on behalf of the user. The virtual contact is created and placed in the queue, and both the user and the user's proxy are associated with the virtual contact. At this point, four "states" that will be described later in more detail are available to both the user and the user's proxy, for a total of sixteen states. Either the user, the user's proxy, or both may have a physical connection with the ACD or not, may be logged onto the presence server or not. In one embodiment, as the user and the user's proxy remain in the queue, a connection (e.g., conference) may be established between the user and the proxy such that the user and the user's proxy may talk, exchange messages (e.g., IM or SMS) or otherwise communicate while awaiting the attorney. When the agent is available, or about to become available, the user and/or the user's proxy may be notified. Ultimately, the communication session with the attorney may include the attorney and the user and/or the user's proxy. For example, a three-way conference call connection may be established among the attorney, the user and the user's proxy.

User 64 may call into ACD 42 on an endpoint 66 to fulfill the proxy designation on behalf of user 60. In some cases, user 64 may have a limited amount of time to call in to fulfill the proxy designation for user 60. Such time constraint may be designated by user 60 or by ACD 42. Endpoint 66 may comprise a home or office phone, cell phone, IP phone, PC or other suitable device. If endpoint 66 is an endpoint that can be associated with user 64 by presence server 49 (for example, through a GUID of the endpoint or otherwise and the URI of user 64), then presence server 49 can detect the presence of user 64 and ACD 42 may automatically substitute user 64 for the place of user 60 on the call of user 60 in ACD 42. However, in some cases presence server 49 may require a user-specific password or other type of authentication to detect the presence of user 64.

In particular embodiments, after user 60 has designated user 64 to act as proxy for user 60, ACD 42 may call user 64 on an endpoint of user 64, such as a home phone or office phone, IP phone, cell phone or PC of user 64. After authentication of user 64 by presence server 49, user 64 may fill in for user 60 on the original call of user 60 with ACD 42.

In particular embodiments, user 60 may query, through IM or otherwise, multiple potential proxy designees as to their availability to act as a proxy for the user on a call. Thus, in addition to having a static proxy, such as a user's spouse, who may always act on behalf of user 60, user 60 may also have dynamic proxy designees that user 60 may add or remove from a proxy designee list with proxy server 51 depending on particular circumstances or needs relating to one or more calls or situations. In particular circumstances, proxy users may be designated for a specific or an indefinite amount of time or for specific tasks or activities.

It should be understood that a user who makes a call to ACD 42 may cycle through at least four "states" of communication with ACD 42. When the user initially calls the ACD, the user may be in a "call only state" (e.g., a telephony connection is established between the user's endpoint and ACD 42). After logging onto presence server 49 at which time presence information of the user is received by the presence server 49, the user may be in a "call and presence state" (e.g., connection is established and user presence is detected). After a virtual contact has been established in queue 54 and there is no active voice connection between the ACD and the user, the user may be in a "presence only state." While in the presence only state, the user remains logged into the presence server as a virtual contact associated with the user's presence and the initial request for service progresses through the queue. Another state may be achieved by the user once the user logs off of the presence server. In this state, there is no active connection, and the user is not logged into the presence server. However, the virtual contact still progresses through the queue on behalf of the user, and the presence server will know the "identity" of the user. Particular embodiments of the present invention allow users to cycle through these states during the call process, without losing the virtual contact (i.e., position in the queue).

ACD 42 may include and maintain a table containing information regarding the state of queue 54 and proxy designations of users. For example, a table may be maintained that lists the order of real and/or virtual contacts being held by the queue. TABLE 1 below is an example of such a table:

TABLE 1

| Contact ID | User Presence | Active Call ID | Alternate Communication | Proxy Flag (1/0) | Proxy User Presence |
|---|---|---|---|---|---|
| 1 | $P_1$ | $CID_1$ | $IM_1$ | 1 | $PU_1$ |
| 2 | $P_2$ | None | $SMS_2$ | 0 | None |
| 3 | $P_3$ | $CID_3$ | None | 0 | None |
| 4 | $P_4$ | None | $IM_4$ | 1 | $PU_4$ |
| 5 | $P_5$ | None | None | 1 | $PU_5$ |
| . | . | . | . | . | . |
| . | . | . | . | . | . |
| . | . | . | . | . | . |
| n | $P_n$ | $CID_n$ | $SMS_n$ | 1/0 | $PU_n$ |

In TABLE 1 above, the "Contact ID" column represents an index of the queue. The "User Presence" column lists the presents of users in their current order awaiting connection with an agent. Such presence may be identified by users' URIs or another suitable identifier. The "Active Call ID" column lists the call ID number associated with those user's currently waiting for an agent on an active connection with the ACD. For those users who may be waiting on an agent through a virtual contact, this column lists "None," because the virtual contact holds the place of the user in the queue when the user is not actively connected with the ACD. If such a user calls into the ACD to hold for an agent on an active connection, then the call ID representing the globally unique call id of said call. The "Alternate Communication" column holds the relevant information regarding the method of notifying the user about the user's place or status in the queue. This information is associated with the presence $P_i$ of user i. When there is no alternate communication path available to a user, the appropriate entry in the table is set to "None."

The "Proxy Flag" column indicates for each call whether the initial user has designated a proxy user to handle the call on behalf of the initial user. A "1" indicates that a proxy has been designated, and a "0" indicates that no proxy has been designated. The "Proxy User Presence" column indicates the presence of the designated proxy users for their applicable calls. Such presence may be identified by the proxy users' URIs or another suitable identifier.

The user's proxy may have similar entries in TABLE 1, to those described above. For example, the user's proxy may have a Contact ID and other common fields to those described above with respect to the user.

User 60 may move freely between various endpoints, such as the user's office phone, cell phone and home phone, re-establishing his presence on any desired endpoint. The presence on the new device is recognized by ACD 42, and the user is associated with his virtual contact in the queue. Using this association, the call and the IM or other notification messages may be routed to user 60 while freeing the user to roam freely between his endpoint devices. In one embodiment, the system may send multiple identical notifications to a given user; for example, one may be sent to the user's SMS connection and another to the user's IM connection.

The ability to establish a virtual contact to hold a user's place in the queue and end a real call may be useful in a variety of situations and circumstances. For example, a user and ACD may avoid using phone connection time by waiting on progression through the queue through a virtual contact instead of holding on a live connection with an ACD. This may save any of a number of resources. For example, users may save cell phone usage minutes by not having to wait on an agent while maintaining a connection. Moreover, users and ACD operators may save IP and conventional phone expenses (i.e., minute and connection fees) by not having to stay connected while waiting on connection with a suitable agent.

Another example in which features of particular embodiments may be useful is in the event that a user is holding on a cell phone for an agent, and the user loses cell phone service and the ACD connection (for example, if the user is driving through a tunnel). The ACD may automatically establish a virtual contact in the queue to replace the actual connection with the user. The user may call back when his cell phone service is restored, and the presence server of the ACD may recognize the user's presence and replace the virtual contact with the new real connection so that the user never loses his place in the queue. Alternatively, the ACD may call the user at his office, for example, after he logs into the presence server from this office phone.

The ability to designate a proxy that may act on behalf of a user enables a user that begins an ACD call to transition the call to a different, proxy user to complete the transaction of the call. This can save considerable time since an initial user who may not be able to complete the call does not have to call back and begin the call process over. The ability to designate proxy users also allows two callers who do not utilize the same phone, are not in the same location and are not on the same telephone or other exchange to participate in the call process.

The proxy designation ability also adds security to the call process for a user. For example, the user does not have to give his password or other authentication information to another user to handle the call for the initial user. In such cases, there would be no separate record of the other user's activities and misuse may be more likely to occur. However, with proxy designation ability, an audit trail and record is created so that each action by each respective user (both the initial user and the proxy user) is recorded as such. Moreover, security is further increased since the initial user can alter proxy designations as needed, depending on specifics of a particular call or conduct of a particular proxy user.

As indicated above, while particular embodiments of the present invention described herein relate to ACDs, it should be understood that the proxy designation ability discussed herein can be utilized with other types of call systems, such as conference call and online meeting systems. For example, a user on a conference call may designate a proxy user to act on the initial user's behalf on the call. Presence detection may be used on the conference call to detect the presence of the proxy user on the conference call. Moreover, an initial user who has a conference call scheduled in the future may designate a proxy user to handle the call on behalf of the initial user when it may be too late to reschedule the call. In such case, the initial user may notify a conference call system of such designation, and the proxy user may handle the call as designated.

The server(s) used to accomlish the teachings of the present invention may also be configured to generate reports that indicate when and how proxy designations are accomplished, which user(s) designated which user proxy(s), and a history of the activities of the user and the user proxy. In this manner, the server is configured to keep track of the identity of any participant in a communciation session, and any actions/decisions may be attributed to the individual that took the action and/or made the decision.

Figure 3:
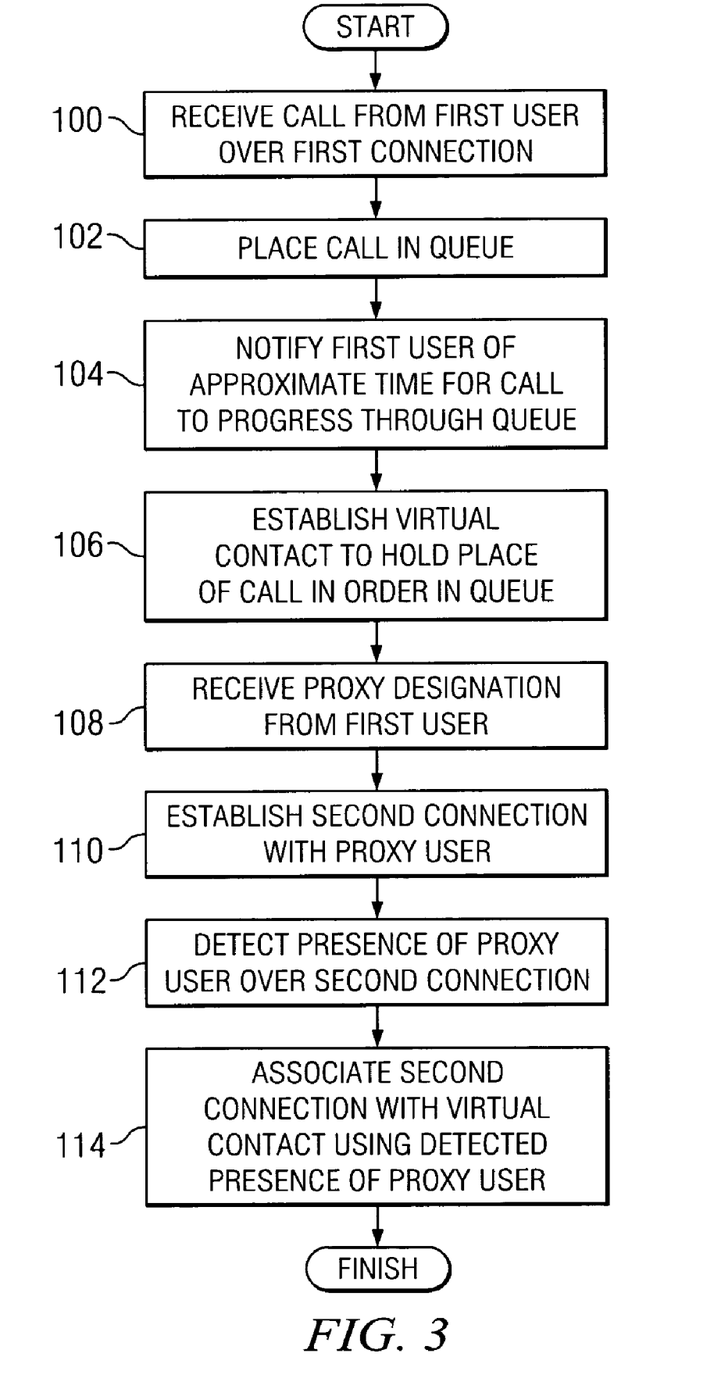
FIG. 3 illustrates a method for utilizing proxy designation in a call system, in accordance with an embodiment of the present invention.

FIG. 3 is a flowchart illustrating a method for utilizing proxy designation in a call system, in accordance with a particular embodiment of the present invention. The method begins at step 100 where a call is received from a first user over a first connection. The call may comprise a request for service from a suitable agent and may be received at an interface port of an automatic call distributor or other call system. The first connection may be with an endpoint of the first user, such as the first user's home phone, IP phone, cell phone or PC. At step 102, the call is placed in a queue. For example, if the call is to an automatic call distributor, the call may be placed in a queue until a suitable agent becomes available to provide service to the first user. In particular embodiments, the call may not be placed in a queue.

At step 104, the first user is notified of an approximate time for the call to progress through the queue. Such notification may be made by voice, IM, SMS text messaging or by another suitable method. If the call is not placed in a queue, then this step may be omitted. At step 106, a virtual contact is established to hold a place of the call in the order in the queue if the first connection is terminated. If the call was not placed in a queue, then this step may be omitted.

At step 108, a proxy designation is received from the first user. The proxy designation comprises a proxy user that the first user designates to handle the call for the first user. The proxy designation may comprise a URI or other identifier of the proxy user. The proxy designation may additionally comprise an authority grant to the proxy user for handling the call. For example, the authority grant may be a grant for all or less than all of the first user's authority to perform certain tasks and activities on the call. The proxy designation may be for a specific time duration as well. The proxy designation may be received through DTMF signaling, IM, SMS text messaging, speech recognition or another suitable method. In particular embodiments, the proxy user may be updated of the status of the call progressing through the queue. It should be recognized that the proxy designation may be made at any time prior to the establishment of the virtual contact, and does not require that the user make the designation after placing a call and establishing a connection with the ACD. For example, the proxy designation may be made using web administration or other system configuration activity.

At step 110, a second connection is established with the proxy user. In particular embodiments, the second connection may be established by a processor of the call system either by the call system calling the proxy user or by the proxy user calling the call system. At step 112, the presence of the proxy user is detected over the second connection. Such presence detection may be accomplished automatically by a presence server that recognizes an endpoint of the second user that the second user uses for the second connection or through authentication using a password of the proxy user. Presence information, such as a URI or other relevant information, of the proxy user previously obtained may be used by the presence server to detect the presence of the proxy user. At step 114, the second connection is associated with the virtual contact using the detected presence of the proxy user.

Some of the steps illustrated in FIG. 3 may be combined, modified or deleted where appropriate, and additional steps may also be added to the flowchart. Additionally, steps may be performed in any suitable order without departing from the scope of the invention.

Although the present invention has been described in detail with reference to particular embodiments, it should be understood that various other changes, substitutions, and alterations may be made hereto without departing from the spirit and scope of the present invention. For example, although the present invention has been described with reference to a number of elements included within communication system 30 and automatic contact distributor 42, these elements may be combined, rearranged or positioned in order to accommodate particular routing architectures or needs. For example, presence server 49 and proxy server 51 may be combined into one component that performs the functions of both the presence server and the proxy server described herein. In addition, any of these elements may be provided as separate external components to communication system 30, automatic contact distributor 42 or each other where appropriate. The present invention contemplates great flexibility in the arrangement of these elements as well as their internal components.

Numerous other changes, substitutions, variations, alterations and modifications may be ascertained by those skilled in the art and it is intended that the present invention encompass all such changes, substitutions, variations, alterations and modifications as falling within the spirit and scope of the appended claims. Moreover, the present invention is not intended to be limited in any way by any statement in the specification that is not otherwise reflected in the claims.

What is claimed is:

1. A method for utilizing proxy designation in a call system, comprising:
   receiving a call from a first user over a first connection with a first endpoint of the first user;
   receiving a proxy designation from the first user, the proxy designation comprising a proxy user designated to handle the call for the first user;
   establishing a second connection with the proxy user; and
   detecting the presence of the proxy user over the second connection.

2. The method of claim 1, wherein detecting the presence of the proxy user comprises authenticating the proxy user using a password of the proxy user.

3. The method of claim 1, wherein the proxy designation comprises a uniform reference identifier (URI) of the proxy user.

4. The method of claim 1, wherein the proxy designation comprises an authority grant to the proxy user for handling the call for the first user.

5. The method of claim 1, wherein the proxy designation comprises a plurality of proxy users to handle the call for the first user.

6. The method of claim 1, wherein the proxy designation is received through instant messaging (IM).

7. The method of claim 1, wherein the proxy designation is received through short message service (SMS) text messaging.

8. The method of claim 1, wherein the proxy designation is received through dual tone multiple frequency (DTMF) signaling.

9. The method of claim 1, wherein the proxy designation is received through speech recognition.

10. The method of claim 1, wherein the proxy designation is accomplished via web administration or other system configuration activity.

11. The method of claim 1, wherein the proxy designation is accomplished prior to receiving the call from the user.

12. The method of claim 1, further comprising:
    placing the call in a queue until a suitable agent becomes available to provide service; and
    notifying the first user of an approximate time for the call to progress through the queue.

13. The method of claim 12, further comprising:
    establishing a virtual contact to hold a place of the call in an order in the queue if the first connection is terminated; and
    associating the second connection with the virtual contact using the detected presence of the proxy user.

14. The method of claim 13, further comprising:
    receiving notification from the first user to terminate the first connection and hold the place of the call in the order in the queue; and
    wherein the virtual contact is established after receipt of the notification from the first user to terminate the first connection and hold the place of the call in the order in the queue.

15. The method of claim 13, further comprising updating the proxy user of a status of the virtual contact in the queue.

16. The method of claim 15, further comprising updating the user of the status of the virtual contact in the queue.

17. The method of claim 1, further comprising selecting one of the user or the proxy user for connection with an agent, if both the user and the proxy user are available for connection with the agent.

18. The method of claim 1, further comprising:
    establishing a commnnication session between the user and the user's proxy while the virtual contact is in the queue; and
    connecting both the user and the proxy user with an agent when the agent becomes available.

19. The method of claim 1, further comprising associating each of the user and the proxy user with the virutal contact.

20. The method of claim 1, wherein the call system comprises an automatic call distributor and wherein the call comprises a request for service from a suitable agent.

21. A call system utilizing proxy designation, comprising:
    at least one interface port operable to receive a call from a first user over a first connection with a first endpoint of the first user;
    a proxy server operable to receive a proxy designation from the first user, the proxy designation comprising a proxy user designated to handle the call for the first user;
    a processor operable to establish a second connection with the proxy user; and
    a presence server operable to detect the presence of the proxy user over the second connection.

22. The system of claim 21, wherein the presence sever is operable to detect the presence of the proxy user by authenticating the proxy user using a password of the proxy user.

23. The system of claim 21, wherein the proxy designation comprises a uniform reference identifier (URI) of the proxy user.

24. The system of claim 21, wherein the proxy designation comprises an authority grant to the proxy user for handling the call for the first user.

25. The system of claim 21, wherein the proxy designation comprises a plurality of proxy users designated to handle the call for the first user.

26. The system of claim 21, wherein the proxy server is operable to receive the proxy designation through instant messaging (IM).

27. The system of claim 21, wherein the proxy server is operable to receive the proxy designation through short message service (SMS) text messaging.

28. The system of claim 21, wherein the proxy server is operable to receive the proxy designation through dual tone multiple frequency (DTMF) signaling.

29. The system of claim 21, wherein the proxy server is operable to receive the proxy designation through speech recognition.

30. The system of claim 21, wherein the proxy designation is accomplished via web administration or other system configuration activity.

31. The system of claim 21, further comprising:
a queue operable to retain the call until a suitable agent becomes available to provide service; and
wherein the processor is operable to notify the first user of an approximate time for the call to progress through the queue.

32. The system of claim 31, wherein the processor is further operable to:
establish a virtual contact to hold a place of the call in an order in the queue if the first connection is terminated; and
associate the second connection with the virtual contact using the detected presence of the proxy user.

33. The system of claim 32, wherein the processor is further operable to:
receive notification from the first user to terminate the first connection and hold the place of the call in the order in the queue; and
establish the virtual contact after receipt of the notification from the first user to terminate the first connection and hold the place of the call in the order in the queue.

34. The system of claim 32, wherein the processor is further operable to update the proxy user of a status of the virtual contact in the queue.

35. The system of claim 21, wherein the call system comprises an automatic call distributor and wherein the call comprises a request for service from a suitable agent.

36. A call system utilizing proxy designation, comprising:
means for receiving a call from a first user over a first connection with a first endpoint of the first user;
means for receiving a proxy designation from the first user, the proxy designation comprising a proxy user designated to handle the call for the first user;
means for establishing a second connection with the proxy user; and
means for detecting the presence of the proxy user over the second connection.

37. The system of claim 36, wherein means for detecting the presence of the proxy user comprises means for authenticating the proxy user using a password of the proxy user.

38. The system of claim 36, wherein the proxy designation comprises an authority grant to the proxy user for handling the call for the first user.

39. The system of claim 36, further comprising:
means for placing the call in a queue until a suitable agent becomes available to provide service; and
means for notifying the first user of an approximate time for the call to progress through the queue.

40. The system of claim 39, further comprising:
means for establishing a virtual contact to hold a place of the call in an order in the queue if the first connection is terminated; and
means for associating the second connection with the virtual contact using the detected presence of the proxy user.

41. The system of claim 40, further comprising:
means for receiving notification from the first user to terminate the first connection and hold the place of the call in the order in the queue; and
wherein the virtual contact is established after receipt of the notification from the first user to terminate the first connection and hold the place of the call in the order in the queue.

42. The system of claim 40, further comprising means for updating the proxy user of a status of the virtual contact in the queue.

43. The system of claim 36, wherein the call system comprises an automatic call distributor and wherein the call comprises a request for service from a suitable agent.

44. Software embodied in a computer readable medium, the computer readable medium comprising code operable to:
receive a call from a first user over a first connection with a first endpoint of the first user;
receive a proxy designation from the first user, the proxy designation comprising a proxy user designated to handle the call for the first user;
establish a second connection with the proxy user; and
detect the presence of the proxy user over the second connection.

45. The medium of claim 44, wherein code operable to detect the presence of the proxy user comprises code operable to authenticate the proxy user using a password of the proxy user.

46. The medium of claim 44, wherein the proxy designation comprises an authority grant to the proxy user for handling the call for the first user.

47. The medium of claim 44, further comprising code operable to:
place the call in a queue until a suitable agent becomes available to provide service; and
notify the first user of an approximate time for the call to progress through the queue.

48. The medium of claim 47, further comprising code operable to:
establish a virtual contact to hold a place of the call in an order in the queue if the first connection is terminated; and
associate the second connection with the virtual contact using the detected presence of the proxy user.

49. The medium of claim 48, further comprising code operable to:
receive notification from the first user to terminate the first connection and hold the place of the call in the order in the queue; and
wherein the virtual contact is established after receipt of the notification from the first user to terminate the first connection and hold the place of the call in the order in the queue.

50. The medium of claim 48, further comprising code operable to update the proxy user of a status of the virtual contact in the queue.

51. The medium of claim 44, wherein the call system comprises an automatic call distributor and wherein the call comprises a request for service from a suitable agent.

52. A method for utilizing proxy designation in a call system, comprising:
  receiving a call from a first user over a first connection with a first endpoint of the first user;
  receiving a proxy designation from the first user, the proxy designation comprising a proxy user designated to handle the call for the first user;
  establishing a second connection with the proxy user; and
  detecting the presence of the proxy user over the second connection,
  establishing a virtual contact to hold a place of the call in an order in a queue if the connection is terminated;
  wherein each of the user and the user's proxy may independently cycle between a call only state, a call and presence state and a presence only state, while maintaining the place of the call in the order in the queue.

* * * * *